United States Patent [19]

Holmberg et al.

[11] Patent Number: 4,982,185
[45] Date of Patent: Jan. 1, 1991

[54] SYSTEM FOR SYNCHRONOUS MEASUREMENT IN A DIGITAL COMPUTER NETWORK

[75] Inventors: Rainer Holmberg, Stow; Frank S. Ordway, Dedham, both of Mass.

[73] Assignee: BLH Electronics, Inc., Canton, Mass.

[21] Appl. No.: 353,406

[22] Filed: May 17, 1989

[51] Int. Cl.$^5$ .......................... G06F 13/00; H04Q 9/00
[52] U.S. Cl. ...................... 340/825.210; 340/825.070; 340/825.050; 340/825.520; 340/870.040; 370/94.100
[58] Field of Search ........... 340/825.21, 825.2, 825.06, 340/825.07, 825.08, 825.05, 825.52, 539, 870.02, 870.03, 870.04, 870.06; 370/94.1, 85.4, 85.5

[56] References Cited

U.S. PATENT DOCUMENTS

| 4,161,634 | 7/1979 | Bellisio | 340/825.52 |
| 4,476,469 | 10/1984 | Lander | 340/539 |
| 4,530,045 | 7/1985 | Petroff | 340/825.07 |
| 4,637,013 | 1/1987 | Nakamura | 370/85.4 |
| 4,742,335 | 5/1988 | Vogt | 340/825.08 |
| 4,849,752 | 7/1989 | Bryant | 340/825.07 |
| 4,855,729 | 8/1989 | Takenchi et al. | 340/825.07 |

Primary Examiner—Donald J. Yusko
Assistant Examiner—Peter S. Weissman
Attorney, Agent, or Firm—Fish & Richardson

[57] ABSTRACT

A synchronous distributed measurement system in a digital computer network comprising a master node and a plurality of slave nodes interconnected by communications links to form a ring. The master mode includes a message transmitter for transmitting a synchronizing message over a communications link. Each slave node includes an operational portion for performing selected operations. A message receiver receiving the synchronizing message from a communications link, and a message transmitter responsive to receipt of the synchronizing message for retransmitting the synchronizing message over the communications link. An operational control portion starts the measurement portion a selected delay time after the message receiver receives the synchronizing message, the delay time providing that the operational portions of the slave nodes perform the measurements in synchronization.

18 Claims, 6 Drawing Sheets

NETWORK 10

NETWORK 10

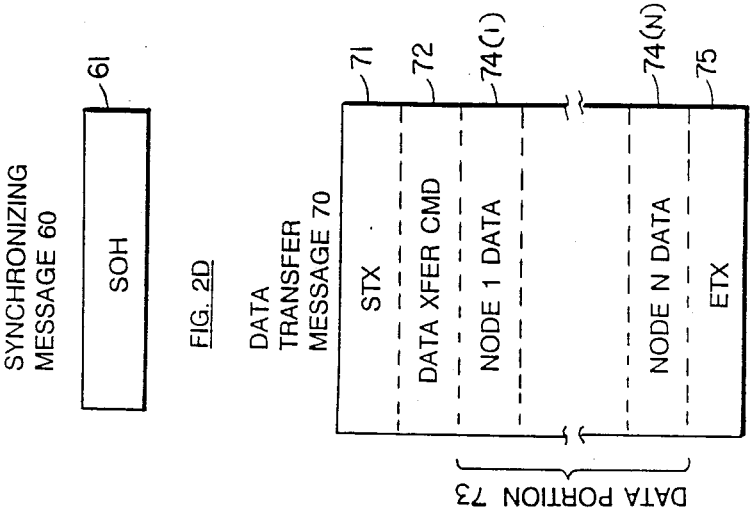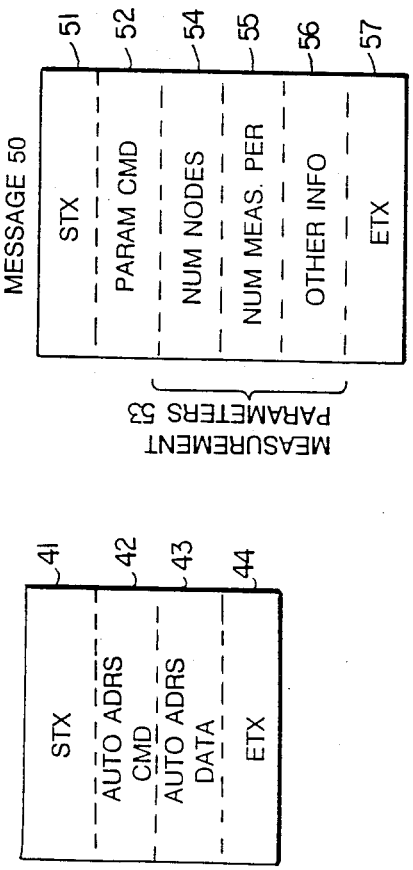

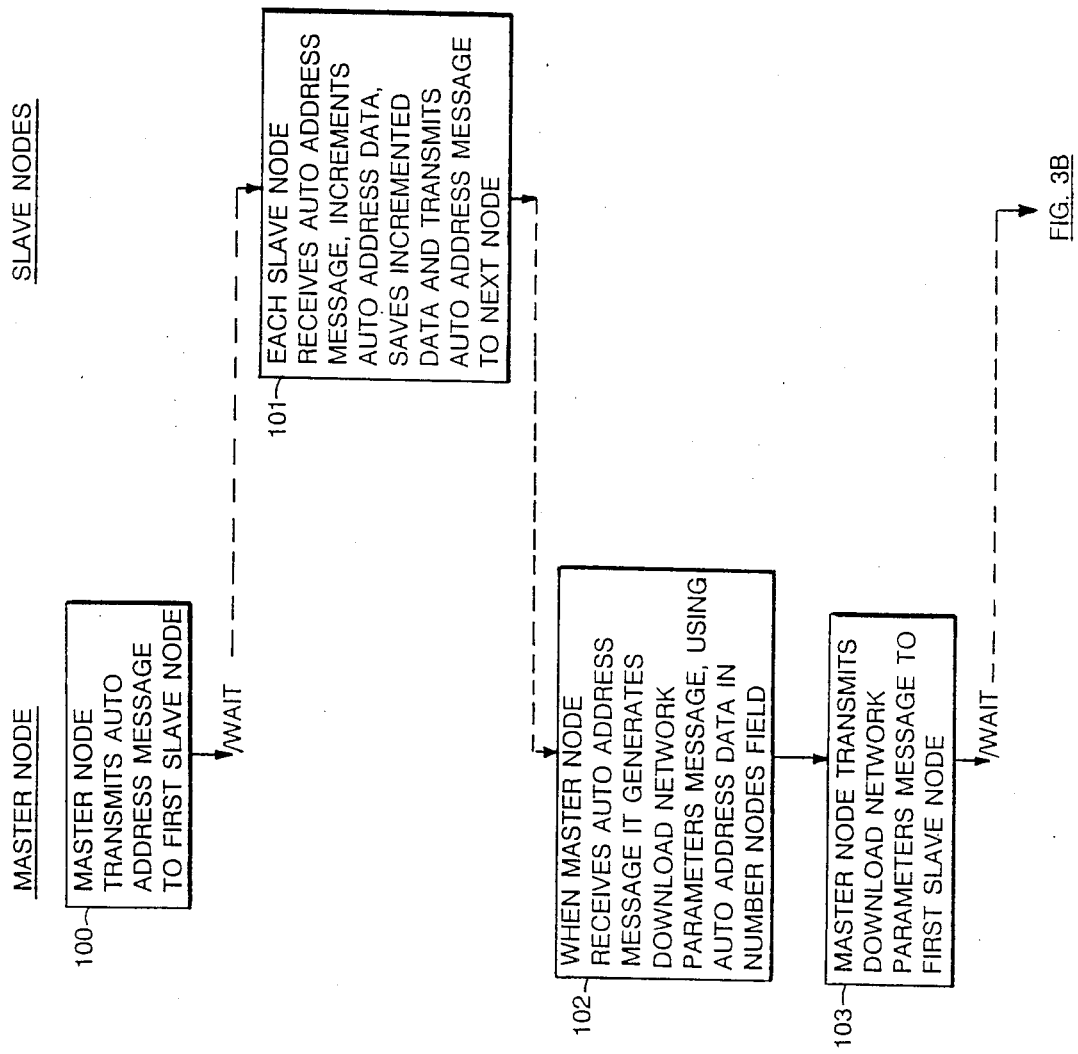

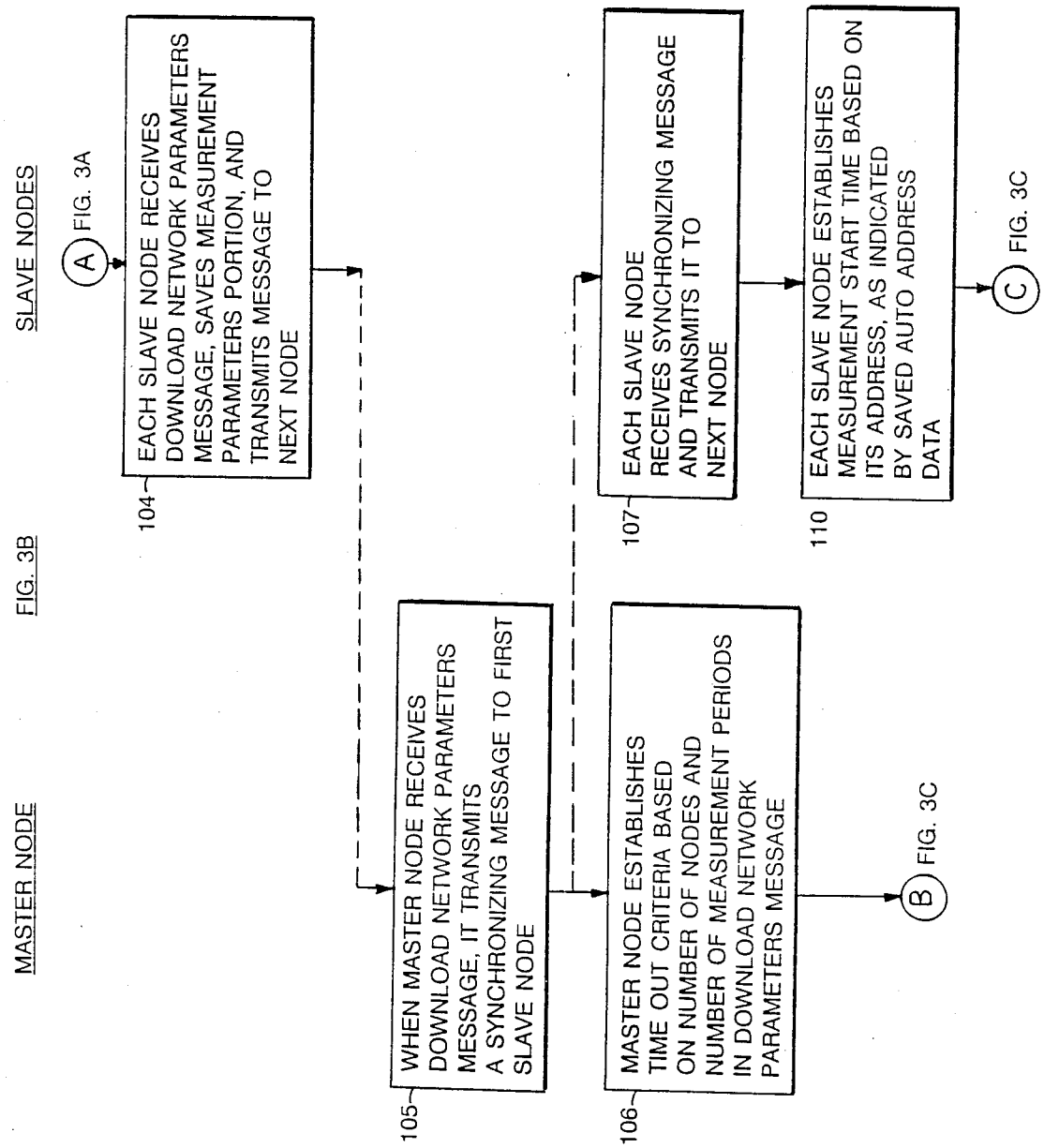

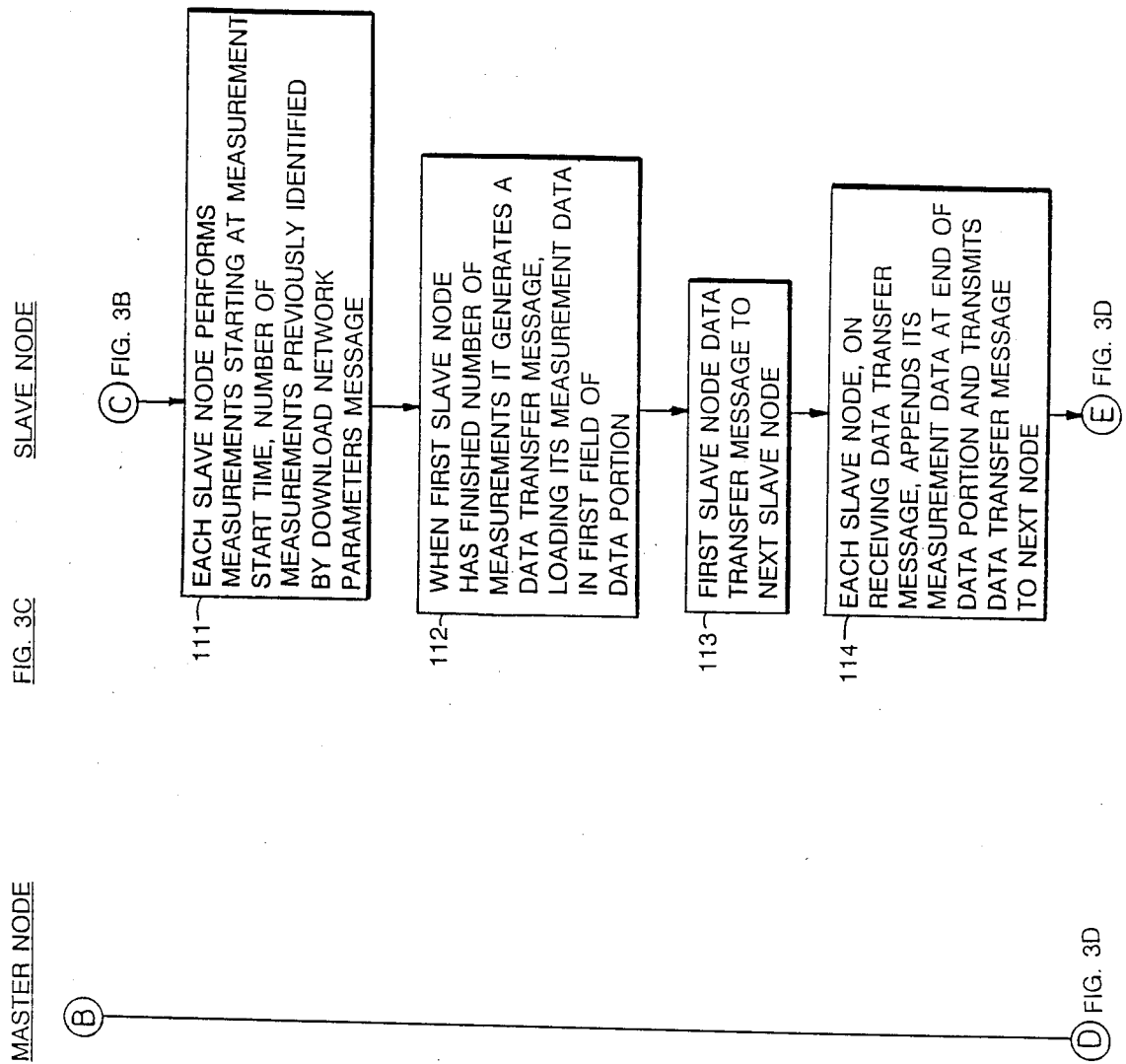

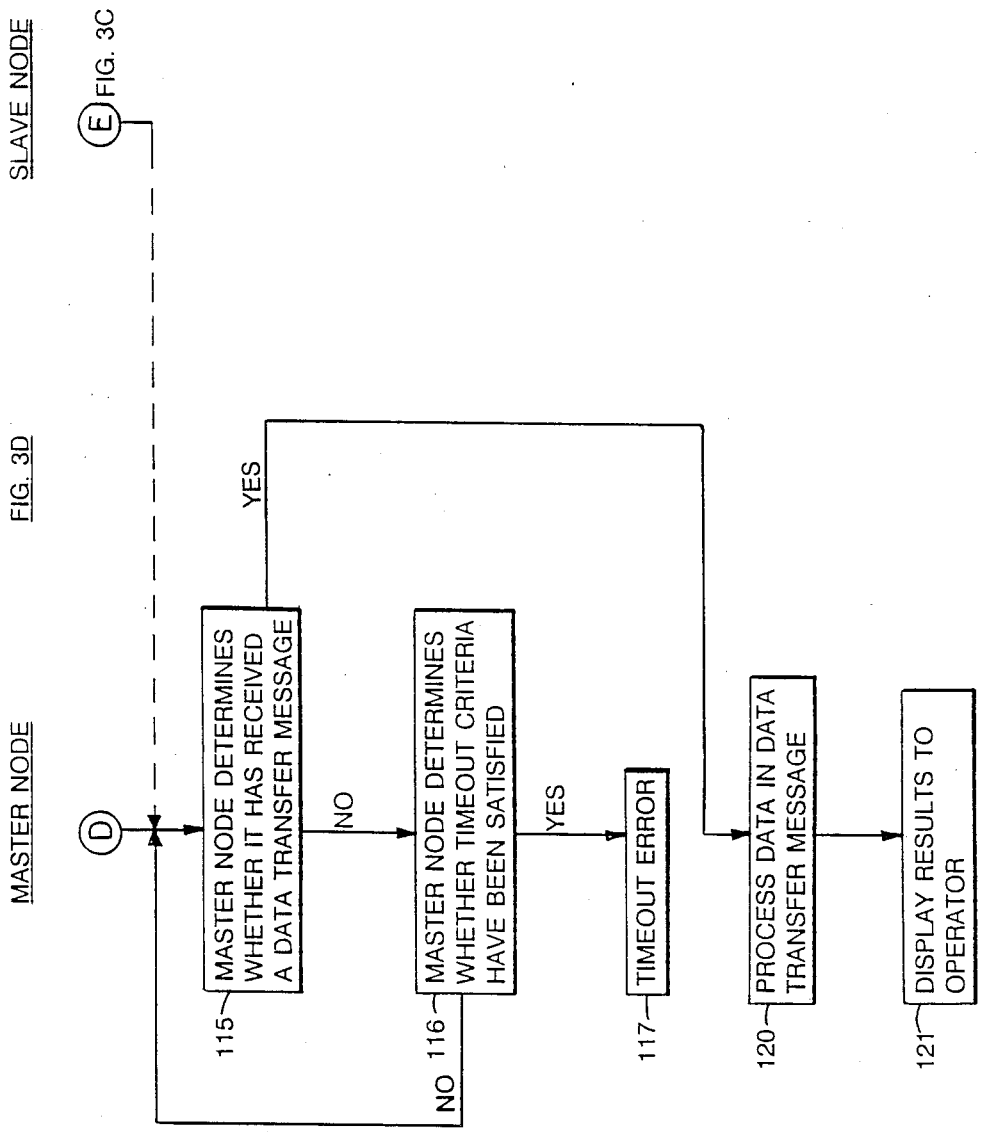

SYSTEM FOR SYNCHRONOUS MEASUREMENT IN A DIGITAL COMPUTER NETWORK

FIELD OF THE INVENTION

The invention relates generally to the field of distributed measurement of physical quantities where the resultant measure benefits from real-time synchronization.

BACKGROUND OF THE INVENTION

Measurement of physical quantities, such as pressure, temperature, and force in a time variable system, is typically accomplished with analog summing of signals or relatively costly high-speed parallel hardware architectures. Both of these solutions are limiting with regard to distributive measurement due to small signal levels and limited resolution versus cost.

To overcome these handicaps, in the invention the analog to digital conversion is provided at a local measurement device and, utilizing relatively inexpensive integrating converters and microcomputers, low level signals are easily converted to high-resolution values including corrections for sensor and electronic related errors. With this distribution of measurement function, the time relationship of each measurement is synchronized through a computer network and the local microcomputers' control of the measurement. All nodes in the network begin measuring in response to a master synchronizing command. A system master, upon retrieving the synchronized digital data, develops a data base which provides measurement and computation capability greatly improved over prior techniques.

SUMMARY OF THE INVENTION

The invention provides a new and improved measurement system utilizing distributed measurement nodes in a network.

In one aspect, the invention provides a distributed digital measurement system comprising a master node and a plurality of slave nodes interconnected by communications links to form a ring. The master node includes a message transmitter for transmitting a synchronizing message over a communication link. Each slave node includes an operational portion for performing selected operations. A message receiver receives the synchronizing message from a communications link, and a message transmitter responsive to receipt of the synchronizing message for retransmitting the synchronizing message over the communications link. An operational control portion begins measurement after a computed delay time from the synchronizing message and the node's predetermined position within the network.

In another aspect, the invention provides a distributed digital measurement system comprising a master node and a plurality of slave nodes interconnected by communications links. The master includes a message transmitter for sending a synchronizing message over a communications link. The slave nodes receive the synchronization message simultaneously and operational control portions therein begin measurement operations immediately.

In another aspect, the invention provides slave node for use in a distributed digital measurement system comprising a plurality of slave nodes interconnected in a ring. The slave node comprises an operational portion for performing selected operations. A message receiver receives a synchronizing message from a communications link and an operational control portion determines a delay requirement prior to starting a measurement.

In yet another aspect, the invention provides a method of operating a distributed digital measurement system comprising a master node and a plurality of slave nodes and a master node interconnected by communications links to form a ring. The master node transmits a synchronizing message over a communications link. Each slave node receives the synchronizing message from a communications link and an operational portion determines the requirement for retransmission of the synchronizing message with associated calculation of measurement of delay time.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 2A through 2D depict structures of various messages transferred by nodes in the network depicted in FIG. 1; and FIGS. 3A through 3D are flow diagrams depicting the operations of the nodes in the network depicted in FIG. 1.

DETAILED DESCRIPTION OF AN ILLUSTRATIVE EMBODIMENT

Figure 1:
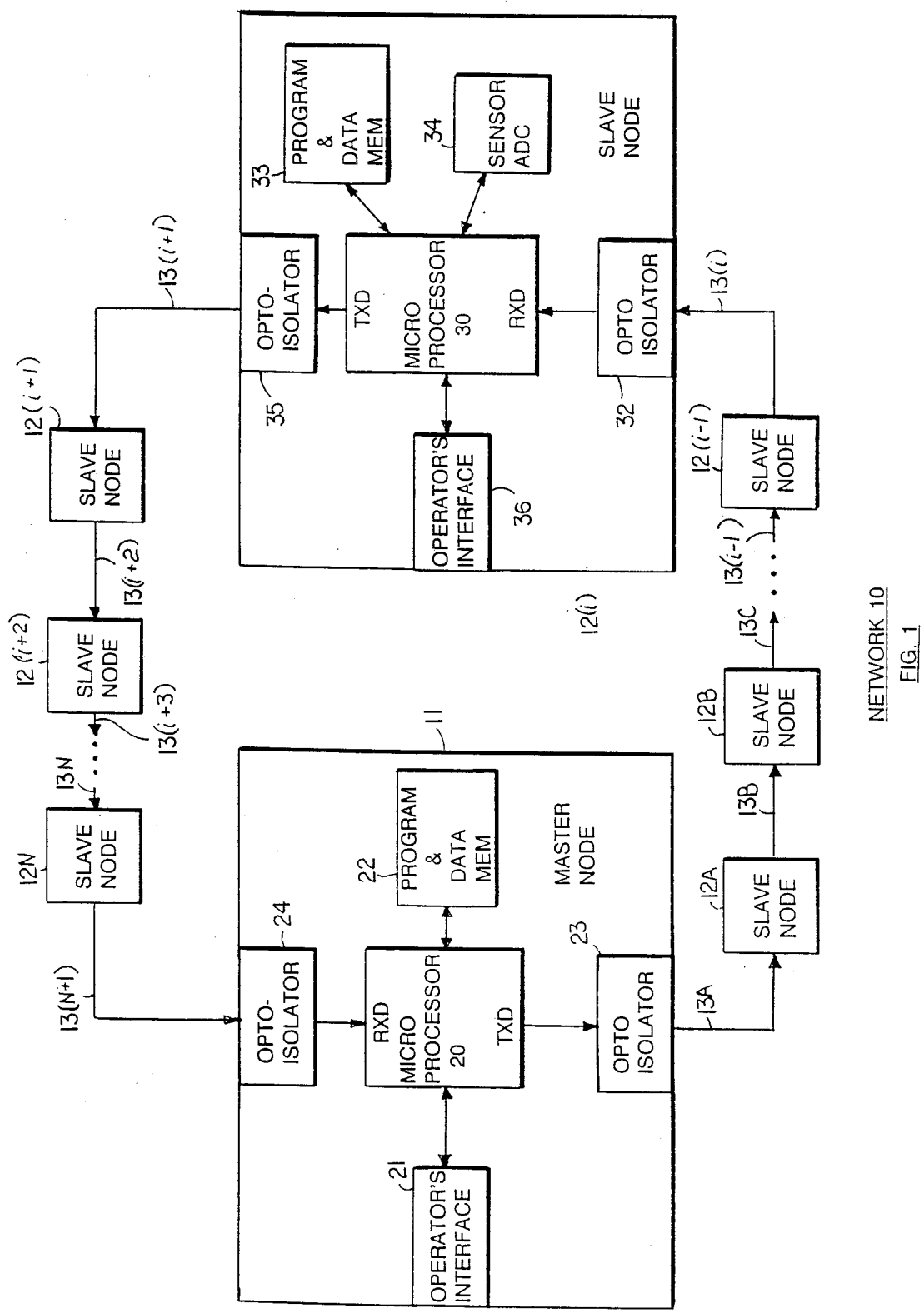
FIG. 1 is a functional block diagram of a computer network constructed in accordance with the invention.

FIG. 1 is a functional block diagram of a distributed digital measurement system 10 constructed in accordance with the invention. With reference to FIG. 1, the system 10 includes a master node 11 and a plurality of slave nodes 12A through 12N (generally identified by reference numeral 12), interconnected, in daisy-chain fashion, by a plurality of communications links 13A through 13(N+1) (generally identified by reference numeral 13). That is, the master node 11 transmits messages over its downstream communications link 13A to the first slave node 12A in the network. As a slave node 12(i) is receiving a message from its upstream communications link 13(i), it transmits a message, which, as described below, may either comprise the same message or a modified message, over its downstream communications link 13(i+1). Thus, the nodes 11 and 12 and the communications links 13 effectively comprise a ring network, with the nodes transmitting messages in one direction (counter-clockwise, as shown in FIG. 1) around the system 10.

The master node 11 operates as a control point in the network, that is, the master node 11, in response to requests from an operator, initiates selected operations in the slave nodes 12, receives data from the slave nodes 12 and performs processing operations on data which it receives from the slave nodes to generate processed information which it provides to the operator.

The particular operations initiated by the master node 11 and performed by the slave nodes 12, and the processing operations performed by the master node 11, depend on the application in which the system 10 is being used. In one particular application, the system 10 is used to weigh large objects, in particular as airplanes, and each of the slave nodes 12 is included in a weight detector module placed under each wheel of the airplane. In that application, each slave node 12 is connected to a weight sensor comprising a strain gage that is used to generate an electrical signal whose magnitude is related to the weight of the airplane. The master node 11, by means of messages which it transmits over its downstream communications link 13A as described below, enables the slave nodes 12 to perform weigh operations to generate weight information. The master node 11 receives the weight information and processes it to provide the weight of the airplane to the operator.

The master node 11 includes a microprocessor 20 that receives commands from, and provides processed information to, an operator through an operators interface 21. A memory 22 stores information, including the program and data, used by the microprocessor 20 during its operations. The microprocessor, which in one embodiment comprises an Intel 80C31 microprocessor, includes a transmitter and receiver for, respectively, transmitting and receiving digital data signals. The microprocessor 20 thus includes a TXD transmit data terminal through which it transmits digital data signals representing a message to an opto-isolator 23, which, in turn, couples the signals onto the downstream communications link 13A. Similarly, an opto-isolator 24 receives signals comprising a message from the node's upstream communications link 13(N+1) and couples them to an RXD receive data terminal of microprocessor 20.

The structures of the various slave nodes 12 are generally similar, and so the structure of only one slave node 12(i) is shown in detail. That slave node 12(i) includes a microprocessor 30 that controls the node 12(i) in response to messages that it receives, at an RXD receive data terminal, from the node's upstream communications link 13(i) through an opto-isolator 32. The microprocessor 30, using the contents of a memory 33, processes the messages, performing operations set forth therein. In the embodiment described above, the microprocessor 30 may initiate weighing operations using a strain gage, and obtain weight data through a sensor analog to digital converter 34, which converts the analog signal provided by the strain gage to a digital value. The microprocessor also transmits messages through a TXD transmit data terminal to an opto-isolator 35, which, in turn, couples the messages onto the node's downstream communications link 13(i+1) to the next slave node 12(i+1), or to the master node 11 if the slave node 12(i) is the last node in the system 10. The slave node 12(i) may also include an operator's interface 36, which may indicate the operational status of the slave node 12(i).

Each communications link 13 linking two nodes in the system 10 comprises a pair of wires providing a current loop, in which the current in the loop is controlled by the opto-isolator 23 or 35 of the transmitting node, with the variations in the current being detected by the opto-isolator at the receiving node. It will be appreciated that the opto-isolators 23 and 24 in the master node 11, and opto-isolators 32 and 35 in the slave nodes 12, serve to electrically isolate the nodes from each other. This is desirable in applications in which the slave nodes 12 use devices, such as strain gages, which operate at low-voltage levels or which provide signals represented by small changes in voltage levels. In other applications, the nodes 11 and 12 need not be electrically isolated from each other, and so other forms of electrical transmitters and receivers may be used.

As described above, the nodes 11 and 12 communicate by means of messages transmitted over the communications links 13. FIGS. 2A through 2D depict the structures of four types of the messages. With reference to FIG. 2A, an auto-address message 40, originated by the master node 11, includes four fields. A start field 41 contains a value that identifies the start of the message 40. A command field 42 contains a value indicating the message 40 is an auto-address message. An auto-address data field 43 contains an address value, and an end field 44 contains a value that identifies the end of the message 40. As transmitted by the master node 11, the auto-address data field 43 contains a zero value. When each slave node 12(i) receives the auto-address message 40, it increments the value in the auto-address data field 43, saves the incremented value as an address value, and transmits the auto-address message, with the incremented value in the auto-address data field 43, to the next node. Thus, the master node 11 can use the auto-address message to establish the addresses of the slave nodes 12; this can simplify establishment of the system 10 since an operator need not physically establish the network address at each slave node 12 when setting up the network.

After an auto-address message 40, the master node 11 can transmit a download network parameters message 50, which is depicted in FIG. 2B. Like the auto-address message 40, the download network parameters message 50 includes a start field 51 and an end field 57 which contain values indicating the beginning and end of the message. The values in start field 51 and end field 57 of the download network parameters message 50 may be the same as in start field 41 and end field 44 of the auto-address message 40. In addition, the download network parameters message 50 includes a command field 52 which contains a value that identifies the message as a download network parameters message, and a measurement parameters portion 53 that includes several fields 54 through 56 that contain various parameters to be used by the slave nodes during their subsequent operation. In particular, the measurement parameters portion includes a field 54 that identifies the number of slave nodes 12 in the network, a field 55 that identifies a number of iterative operations each slave node 12 is to perform; in the above-identified embodiment, the value in field 55 identifies the number of weighing operations each slave node 12 is to perform during weighing operations initiated by a synchronizing message 60 (FIG. 2C). Other fields, indicated by reference numeral 56 contain additional information used by the nodes 12 in performing their operations; the specific information depends on the particular applications performed by the system 10.

The master node 11 uses a synchronizing message 60 (FIG. 2C) to initiate operations by the slave nodes 12. With reference to FIG. 2C, the synchronizing message 60 comprises a single field 61 which contains a value identifying it as a synchronizing message 60. As described below in connection with FIGS. 3A through 3D, the slave nodes 12, in response to receipt of a synchronizing message 60, and after a delay period, begin operations; in the aforementioned embodiment, the slave nodes 12 begin performing one or more weighing operations, the number of operations corresponding to the value in the field 55 of the last-received download network parameters message 50 (FIG. 2B).

The particular delay period determined by each slave node 12(i) depends on the number of slave nodes 12 in the network 10, which is identified to the slave nodes 12 in the last download network parameters message 50 (FIG. 2B) and the slave node's network address which it determined during its processing of the auto-address message 40. Each slave nodes determines the delay period so that all of the slave nodes 12 will begin operations at the same time, rather than upon receipt of the synchronizing message 60, thus maintaining precise operational synchronization among the slave nodes 12. Thus, the delay periods increase from zero in the last slave node 12, increasing for each upstream slave node 12 by an amount of time corresponding to the transmission and propagation delay between the slave nodes. Since each slave node 12 begins timing its delay period upon receipt of the synchronizing message 60 (FIG. 2C), when the synchronizing message reaches the last slave node 12N the delay periods in all of the slave nodes 12 will time out, and so all of them can begin operations at the same time.

After the first slave node 12A finishes its operations, it initiates transmission of a data transfer message 70, which is depicted in FIG. 2D. With reference to FIG. 2D, the data transfer message 70 includes a start field 71 and an end field 75 which contain values indicating the beginning and end of the message. The values in start field 71 and end field 75 of the download network parameters message 50 may be the same as in corresponding fields of the auto-address message 40 (FIG. 2A) and download network parameters messages 50 (FIG. 2B).

The data transfer message 70 further includes a field 72 which contains a value identifying the message as a data transfer message 70, and a data portion 73 which includes one or more slots (generally identified by reference numeral 74) each including data from a slave node 12. In particular, the first slave node 12A transmits a data transfer message 70 including one slot 74(A) into which slave node 12A loads data for transmission to the master node 11. Thereafter, each slave node 12(i), as it transmits the data transfer message 70 to the next slave node 12(i+1), inserts another slot 74(i) into the data portion 73 into which it loads its data for transmission to the master node 11. Thus, the contents of the sequence of slots 74(A) through 74(N) in the data portion 73 which the data transfer message 70 reaches the master node 11 corresponds to the sequence of data generated by each of the slave nodes 12 during their respective operations in response to the synchronizing message 60 (FIG. 2C).

The master node 11 may also transmit several additional types of messages, depending on the requirements of the particular application in which the system 10 is being used. For example, the master node 11 may use messages of diverse types to initialize various operating conditions in the slave nodes 12, to turn the slave node's operator's interfaces on and off, and to perform various other operations. In addition, the slave nodes 12 may transmit various error messages to identify error conditions. The structures of the messages are generally similar to those depicted in FIGS. 2A, 2B and 2D.

With this background, a detailed description of the operation of the nodes 11 and 12 will be described in connection with the flow chart depicted in FIGS. 3A through 3D. With reference to FIG. 3A, the master node 11, in initializing the system 10, generates an auto-address message 40, including a value of zero in the auto address data field 43, and transmits it over its downstream communications link 13A to the first slave node 12A in the network (step 100). After transmitting the auto-address message 40, the master node waits for a response over its upstream communications link 13(N+1) connected thereto to verify that the message has been properly received by all of the slave nodes 12.

The first slave node 12A receives the auto-address message 40, increments the contents of the auto address data field 43 to a value of "one" and transmits the message 40, with the incremented auto address data field contents over its downstream communications link 13B to the next slave node 12B (step 101). In addition, the slave node 12A, in step 101, saves the contents of the data field, as incremented, as its address in the system 10. Each slave node 12(i), as it receives the auto-address message 40, performs the operations depicted in step 101, and so, at some point later the last slave node 12N will transmit an auto-address message 40 to the master node 11 over its downstream communications link 13(N+1) (step 102). The auto-address message 40 received by the master node 11 over its upstream communications link 13(N+1) effectively forms the response for which it has been waiting, with a data field 43 containing a value that identifies the number of slave nodes 12 in the system 10. The receipt of the auto-address message 40 by the master node 11 effectively verifies that all of the slave nodes 12 have properly received the message 40 and thus have identified their respective addresses.

The master node 11 may generate the auto-address message (step 100) initially when it powers up, or alternatively in response to a command from an operator at its operator interface 21. If the master node generates the auto-address message when it power up, it may periodically transmit the message, stopping when it receives the message from the last slave node 12 in the network.

After it receives an auto-address message 40, the master node 11 generates a download network parameters message 50 (step 102), and transmits it over its downstream communications link 13A to the first slave node 12A in the system 10 (step 103). In generating the download network parameters message 50, the master node 11 loads the contents of the auto address data field 43 into field 54 of the download network parameters message 50 to thereby identify, to all of the slave nodes 12, the number of slave nodes 12 in the network. In addition, the master node 11 loads values into fields 55 and 56 that are used by the slave nodes 12 in performing their subsequent operations. The values loaded into fields 55 and 56 may be provided by the operator through operator interface 21, or alternatively may be default values established by the master node's program stored in its memory 22. In one embodiment, described above, the value store in field 55 identifies the number of sequential measurement operations to be performed by the slave nodes 12. After transmitting the message 50, the master node waits for a response over its upstream communications link 13(N+1), to verify that the slave nodes 11 have properly received the message 50.

As it receives the download network parameters message 50 from its upstream communications link 13A, the first slave node 12A saves the contents of the measurement parameters portion 53 and transmits the message 50 over its downstream communications link 13B (step 104). Step 104 is repeated for each of the slave nodes 12, thereby providing each the information in the measurement parameters portion to each of the slave nodes 12. The last slave node 12N transmits the download network parameters message 50 to the master node 11, effectively providing the response it is waiting for and verifying that the slave nodes 12 have properly received the message 50.

Sometime after receiving the response to the download network parameters message 50, the master node 11 generates a synchronizing message 60 (FIG. 2C), which it transmits to the first slave node 12A over its downstream communications link 13A (step 105) to initiate measurements by the slave nodes 12. The master node 11 then establishes timeout criteria for receiving a data transfer message 70 (FIG. 2D) based on the expected time required for the measurements and the number of slave nodes 12, the latter being related to the length of time required for the data transfer message 70 to be transmitted around the system 10 (step 106).

Upon receiving the synchronizing message 61 from its upstream communications link 13A, slave node 12A re-transmits the synchronizing message 61 over its downstream communications link 13B (step 107). Each of the sequential slave nodes 12B through 12N in the system 10 performs step 107 to transmit the synchronizing message 60 around the network. When each slave node 12 receives the synchronizing message 60, it also establishes a delay time period which it uses to determine when it is to start its measurements (step 110). The slave node 12A determines the length of the delay time period based on its address in the network, which it determined as it transferred the auto-address message 40, the number of slave nodes identified in field 54 of the download network parameters message, and the propagation delay required to transmit messages between slave nodes 12, the result being that all of the slave nodes begin measurements at the same time rather than when they receive the synchronizing message.

Each slave node 12 thereafter begins timing and, after its delay period has timed out, begins its measurements (step 111), the particular measurements depending on the application in which the system 10 is being used. In the aforementioned application, in which the system 10 is used in a system, using weighing platforms incorporating strain gages, for weighing large objects such as airplanes, each slave node 12 will, using its analog to digital converter 34, convert the analog signals provided by the respective strain gages to digital signals. Since the slave nodes 12 delay, from receipt of the synchronizing message 60, by their individually determined delay periods, before beginning the measurements, they begin the measurements at the same time. This ensures that the measurements will be synchronized to eliminate measurement discrepancies that may arise from rocking or other movement of the object being weighed over the various weighing platforms that might otherwise result in erroneous results.

Upon beginning measurements, the slave nodes 12 perform the number of measurements previously identified in the download network parameters message 50, which they received in step 104. In, for example, the aforementioned application, the time required to perform each measurement is fixed, and so the slave nodes 12 perform the successive measurements in synchronization. After the first slave node 12A has finished its last measurement, it generates (step 112) a data transfer message 70 (FIG. 2D) which it transmits (step 113) over its downstream communications link 13B to the second slave node 12B. In generating the message 70, the first slave node creates in the data portion 73 a slot 74(1) into which it inserts the data which it accumulated during its measurements (step 111). Upon receiving the data transfer message 70 over its respective upstream communications link 13(j), each slave node 12(i) creates a new slot 74(i) in the data portion 73 and inserts the data which it accumulated during step 111, and transmits it over its respective downstream communications link 13(i+1) (step 114).

It will be appreciated that the data each slave node 12 loads into its respective slot may comprise either the results of each of the measurements it performed in step 111, or a processed value representing selected processing operations, such as digital averaging, on the results, or both.

As noted above, the slave nodes 12 transmit the data transfer message 70 around the network (step 114), and the last slave node 12N transmits the data transfer message to the master node 11. After transmitting the original synchronizing message 60 in step 105 and establishing timeout criteria in step 106, the master node 11 has been waiting for the data transfer message 70, iteratively testing to determine whether it has been received (step 115, FIG. 3D), and if not determining whether the time since it transmitted the synchronizing message 60 satisfies the timeout criteria (step 116). If so, the master node 11 determines that a timeout error has occurred and may take predetermined corrective or diagnostic actions.

If, however, the master node 11 receives the data transfer message (step 115) before it determines that the timeout criteria are satisfied (step 116), it sequences to step 120 to process the data in the data portion 73 of the data transfer message 70. The particular processing operations depend on the network's application; in connection with the aforementioned illustrative weighing system application, the master node may, for example, generate a value representing the sum of the results in corresponding slots to determine weight values for each of the successive weighing measurements performed by the slave nodes 12 in response to the synchronizing message 60 (step 111). The master node may then average the weight values to determine an average weight value. As a check on the accuracy of the measurements, the master node 11 may also determine deviations between the average weight value and the sums determined for each of the individual measurements, and if the deviations are greater than a predetermined threshold value, may initiate further measurements by the slave nodes to accumulate more weight data. After the master node 11 obtains satisfactory results, it displays them to the operator (step 121).

The system 10 provides a number of advantages. First, the auto-address message 40 (FIG. 2A) effectively permits the system 10 to be self-configuring, that is, an installer need not physically assign addresses to the slave nodes 12 in the network. Furthermore, the auto-address element, followed by the download network parameters message 50, enables the slave nodes 12 to determine their respective positions in the system 10, in particular, the number of slave nodes 12 each is from the last slave node 12N. Using this information, the slave nodes 12 can determine their respective delay periods so that, after receipt of a synchronizing message, they may delay by respective periods to begin measurements in synchronism. The slave nodes 12 thus need not be provided with any absolute time reference to operate in synchronism.

In addition, as indicated above, each slave node 12(i), upon receiving any of the messages from its upstream communications link 13(i) and retransmits it over its downstream communications link 13(i+1). The retransmission delay may be any length of time; however, in one embodiment, each slave node 12(i), upon receiving a byte, comprising one character of a message, substantially immediately retransmits the byte, with a delay only for the processing time required to transfer the byte from its RXD receive data terminal to its TXD transmit data terminal. The effective delay provided at each slave node between the time it begins to receive a message and the time it begins to retransmit the message is approximately the time required to transmit a byte of data over a communications link 13.

It will be appreciated that the synchronizing of measurements by the various slave nodes 12 may be accomplished in other ways. For example, the system, instead of having communications links 13 interconnecting the nodes 11 and 12 in a daisy-chain fashion, as shown in FIG. 1, may include a single communications link to which the master node 11 and all of the slave nodes 12 are connected in parallel. This may be accomplished by a single link or bus extending from the master node 11, and through all of the slave nodes 12, with the slave nodes tapping off of the link, or by a star configuration in which each slave node 12 has a direct and separate link connection to the master node 11, with the master node 11 transmitting messages to the slave nodes over the links in parallel. In either configuration, all of the slave nodes 12 will receive the synchronizing message in parallel, and may begin their measurements in parallel. In that case, the master node 11 need not use an auto-address message 40, and need not transmit a value identifying the number of slave nodes in a field 54 in the download network parameters message 50. Following the measurements, the master node 11 may retrieve the measurement results by polling the individual slave nodes 12.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A synchronous distributed measurement system comprising a master node and a plurality of slave nodes interconnected in sequence by communications links to form a ring,
   A. the master node including a message transmitter for transmitting a synchronizing message over the communications links;
   B. each slave node including:
      i. a measurement portion for performing selected measurements;
      ii. a message receiver for receiving the synchronizing message from the master node, the synchronizing message being received initially by the message receiver of the first slave node;
      iii. a message transmitter responsive to receipt of the synchronizing message for transmitting the synchronizing message over the communication link to the next slave node, the transmitter of the first slave node passing the synchronizing message to the receiver of the second slave node which along with the subsequent slave nodes repeat the process around the ring so that synchronizing message is sequentially received by all the slave nodes but at different times;
      iv. an operational control portion for enabling the measurement portion to perform selected measurements beginning at a different selected delay time after the message receiver receives the synchronizing message for each slave node, the delay time providing that the measurement portions of all the slave nodes perform their respective measurements in synchronization.

2. A system as defined in claim 1 wherein:
   A. the master node message transmitter further transmits an auto address message; and
   B. the slave node message receiver receives the auto address message, the slave node further including auto address message processor for performing a processing operation in connection with the received auto address message to thereby determine an address for the slave node and to generate a processed auto address message, the slave node message transmitter thereafter transmitting the processed auto address message over the communications link as an auto address message.

3. A system as defined in claim 2 wherein the auto address message includes an address field including an address value, the auto address processor in each slave node incrementing the value in the address field, saving the incremented value as the address of the slave node, the auto address message including the incremented value in the address field comprising the processed auto address message.

4. A system as defined in claim 3 wherein the master node includes a message receiver that receives an auto address message from a communications link, the master node's message transmitter thereafter transmitting a parameter message including a slave node number value that identifies the number of slave nodes in the system.

5. A system as defined in claim 4 in which the master node's message transmitter includes in the slave node number value the value from the address field of the auto address message received by its message receiver.

6. A system as defined in claim 4 wherein each slave node message receiver receives a parameter message from its communications link and in response thereto saves the slave node number value, the slave node's message receiver thereafter transferring the parameter message to the slave node's message transmitter for transmission over its communications link.

7. A system as defined in claim 1 wherein each slave node's operational control portion determines the respective delay time based on the number of the particular slave nodes in the chain of slave nodes.

8. A system as defined in claim 4 wherein the operational control portion of each slave node further includes a data transfer message generator for generating a data transfer message for transmission by the slave node's message transmitter.

9. A system as defined in claim 8 in which the data transfer message includes a data portion including at least one data slot for receiving operational results generated by the measurement portion, the data transfer message generator of the first slave node establishing a first slot and loading its operational results thereinto, each other slave node including a data transfer message portion that, upon receipt of a data transfer message by the slave node's message receiver, generates an additional slot and loads its operational results generated by its measurement portion thereinto, and couples the message to its transmitter for transmission to the next slave node.

10. A slave node for use in a synchronous distributed measurement system comprising a plurality of slave nodes interconnected in a ring, each slave node comprising:
   A. a measurement portion for performing selected measurements;
   B. a message receiver for receiving the synchronizing message from a communications link;
   C. a message transmitter responsive to receipt of the synchronizing message for transmitting the synchronizing message over the communications link; and
   D. an operational control portion for enabling the measurement portion to perform said selected measurements beginning at a different selected delay time after the message receiver receives the synchronizing message for each slave node, the delay time providing that the measurement portions of all the slave nodes perform their respective measurements in synchronization without any further control signals.

11. A slave node as defined in claim 10 wherein the slave node message receiver receives an auto address message, the slave node further including auto address message processor for performing a processing operation in connection with the received auto address message to thereby determine an address for the slave node and to generate a processed auto address message, the slave node message transmitter thereafter transmitting the processed auto address message over the communications link as an auto address message.

12. A slave node as defined in claim 11 wherein the auto address message includes an address field including an address value, the slave node's auto address processor incrementing the value in the address field, saving the incremented value as the address of the slave node, the auto address message including the incremented value in the address field comprising the processed auto address message.

13. A slave node as defined in claim 12 wherein each slave node message receiver receives a parameter message from its communications link and in response thereto saves a slave node number value identifying the number of slave nodes in the system, the slave node's message receiver thereafter transferring the parameter message to the slave node's message transmitter for transmission over its communications link.

14. A slave node as defined in claim 13, the slave node's operational control portion determining the respective delay time using the slave node's address value, which the auto address message processor saved during the processing of the auto-address value and the slave node number value from the parameter message.

15. A slave as defined in claim 10 further including a data transfer message generator for generating a data transfer message for transmission by its message transmitter in response to operation by the operational portion.

16. A slave node as defined in claim 15 in which the data transfer message includes a data portion including at least one data slot for receiving operational results generated by the operational portion, the data transfer message generator establishing a first slot and loading operational results thereinto.

17. A slave node as defined in claim 15 including a data transfer message portion that, upon receipt of a data transfer message by its message receiver, generates a slot and loads operational results generated by its operational portion thereinto, and couples the message to its transmitter for transmission.

18. A method of operating a synchronous distributed measurement system comprising a master node and a plurality of slave nodes interconnected by communications links to form a ring, comprising the steps of:
   A. the master node transmitting a synchronizing message over a communications link;
   B. each slave node:
      i. receiving the synchronizing message from a communications link and transmitting the synchronizing message to another slave node over another communications link so that the synchronizing message is sequentially received by all the slave nodes but at different times;
      ii. determining, in response to receipt of the synchronizing message, the delay time for each slave node after which the slave node enables its measurement portion to obtain a measurement value, providing that the end of the different delay times determined by all of the slave nodes are coincident; and
      iii. each slave node performing the measurement at the end of its delay time.

* * * * *